INVENTORS
Robert F. Gunow &
BY Lester C. Oliphant

ATTORNEY

United States Patent Office 2,943,181
Patented June 28, 1960

2,943,181
BRAZING PROCESS AND APPARATUS

Robert F. Gunow and Lester E. Oliphant, Detroit, Mich., assignors of one-half each to Vac-Hyd Processing Corporation, Highland Park, Mich., a corporation of Michigan, and General Motors Corporation, Detroit, Mich., a corporation of Delaware Filed Sept. 30, 1957, Ser. No. 686,913

16 Claims. (Cl. 219—85)

This invention relates to brazing of metals. More particularly this invention pertains to a method of high-temperature vacuum brazing metals which can be employed to successfully bond thin sections of metals without the use of a conventional fluxing agent.

In vacuum brazing, the application of the brazing alloy, the heating cycles and the capillary flow are much the same as in conventional atmospheric brazing operations. Vacuum brazing provides bonded joints of increased strength, increased latitude in the choice of base materials, increased wetting and flow of the brazing alloy, and cleaner final assemblies. Improved mechanical properties of the base materials, particularly ductility, often result from the vacuum brazing process due to the degassing effect on the base metal during the vacuum heating.

Many alloys contain alloying constituents which react unfavorably in protective atmospheres but can be suitably brazed under vacuum conditions. Titanium, aluminum and zirconium additions to alloys, for example, inhibit wetting and flow of the brazing alloy under ordinary conditions. Hence, alloys containing these elements normally cannot be readily bonded. Special procedures employing fluxes, plating and other undesirable methods must be utilized in order to accomplish the required bonding under atmospheric conditions.

A major consideration in the formation of satisfactory brazed joints concerns inhibiting the formation of and removal of surface compounds which are incompatible with the bonding alloy. Oxides on the surface of metals particularly inhibit the wetting thereof by the brazing material. Thus, prevention of oxidation or removal of the formed oxides is necessary for the formation of the satisfactory brazed joint. Conventional fluxing of the surface of the metal to be brazed removes formed oxides. If oxidation of the surface during brazing can be prevented, a flux is not required during the brazing operation. For example, brazing has been conventionally performed without the use of a flux in the presence of reducing atmosphere, such as dry hydrogen, to braze high-chromium-containing alloys.

The brazing of metals in the presence of a reducing atmosphere has not been entirely successful due to the difficulty in obtaining free flow of the reducing gas throughout the structure which is to be brazed. Accordingly, brazing in blind holes and other inaccessible areas in which the reducing atmosphere does not flow still requires the use of a brazing flux. These blind areas often form oxide films on the metal surfaces which interfere with successful brazing. However, the use of a flux in these confined areas often results in flux entrapment therein and possible subsequent corrosion. Tubular heated bundles, fine corrugated and honeycombed sandwich assemblies are examples where the circulation of the reducing gas is not effective.

The removal of oxides from the surface of the metal to be brazed is accomplished primarily by the high temperature and extremely low-pressure conditions employed during vacuum brazing. Some oxides can be disassociated under normal vacuum-brazing conditions and many metallic oxides are vaporized at temperatures and pressures within the limits of the commercial vacuum-brazing operation. The end result is similar to conventional brazing in a reducing atmosphere or the use of a fluxing medium since the surface is cleansed of metal oxides which inhibit wetting thereof.

The oxides of some metals can be vaporized at the extreme lower limit of pressure employed in the commercial brazing apparatus, but the cost required to produce the required degree of evacuation is prohibitive. Further, some oxides of metals are dissociated or vaporized only with difficulty within the extreme lower limits of the conventional commercial vacuum-brazing pressures. In some instances, therefore, it is necessary to use additional means to reduce the remaining metal oxides on the surface of the alloys which are to be brazed. Hence, in the commercial vacuum-brazing operation of alloys, such as those having alloying additions of titanium, aluminum or zirconium in excess of 1.5%, a limited amount of fluxing material is still required to remove the surface oxides. The use of even a limited amount of conventional fluxing material for a brazing operation, however, is still unsatisfactory due to the aforementioned corrosive tendencies and inferior cleansing action obtained. It is therefore desirable to employ some other type of agent which will aid in removing the last traces of oxide formation on the surface of the metal which is to be brazed.

It has been found that in the vacuum brazing of titanium, for example, the presence of lithium metal in the atmosphere will assist in this respect through the volatilization of the lithium and the formation of lithium oxide which does not interfere with the brazing operation. Heretofore, in vacuum brazing of titanium, solid lithium was allowed to melt in the bottom of a retort used. The lithium vaporized uncontrollably during the heating of the furnace and was subsequently substantially lost before the furnace was heated to the brazing temperature, the lithium therefore not being entirely successful in its cleansing action. The use of lithium not only eliminates the use of a conventional flux, since it reduces the remaining surface oxides, but also permits the use of a higher pressure during brazing operation. Lithium removes the last traces of oxygen left in the system and therefore acts as a gettering agent, such as conventionally employed in the manufacture of vacuum tubes. Vaporization of the lithium before the brazing temperature has been obtained does not permit the utmost use to be obtained therefrom.

Among the objects of the present invention are one or more of the following, singly or in combination: to provide an improved method of vacuum brazing; to provide a method of vacuum brazing which can satisfactorily be employed commercially to braze alloys having over 1.5% of aluminum, titanium or zirconium; to provide a method of vacuum brazing for producing improved bonding of brazed joints; to provide a method of vacuum brazing which employs the accurately controlled action of a gettering agent; and to provide an apparatus which can be used to practice the method of vacuum brazing employing the accurately controlled action of a gettering agent.

These and other objects are attained with the present invention in which high-temperature ferrous and nonferrous alloys including titanium are brazed under the conditions of high temperatures and extremely low pressures. The brazing of such metals under these conditions is satisfactorily and conveniently accomplished without employing a conventional flux through the controlled use of a vaporized alkali or alkali earth metal acting as a getting agent during the brazing process. The introduction of the gettering agent into active participation in the brazing process is accurately controlled by means of a special separate heating device which can be activated to vaporize the gettering agent.

Other objects, features and advantages of the present invention become more apparent from the following description of preferred embodiments thereof and from the figures, in which.

Figure 2:
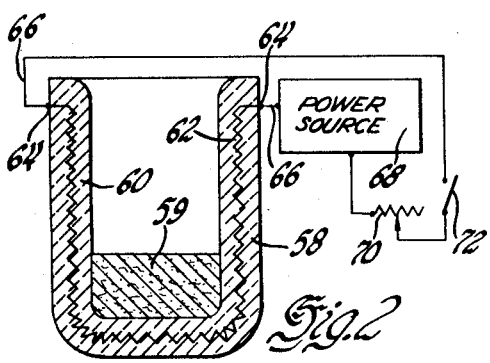
Figure 2 is a schematic view, partially in section, showing means for vaporizing a gettering agent into the atmosphere of an evacuated retort.
Figure 4:
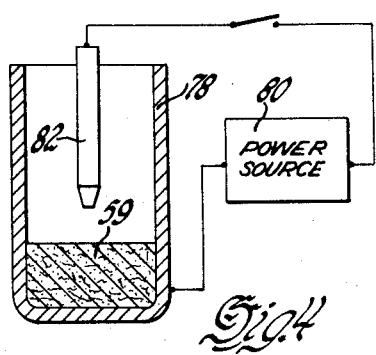
Figure 5:
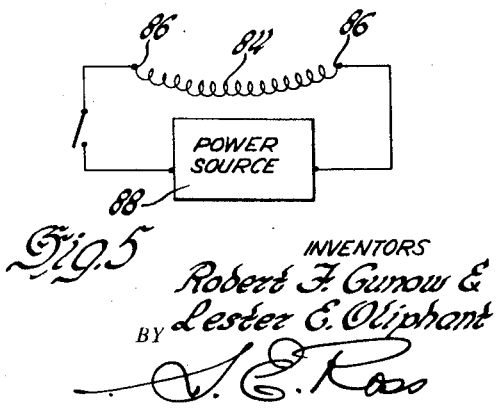

Figure 4 also is a schematic sectional view of a further modification of the device shown in Figure 2; and Figure 5 is a diagrammatic view of an additional means for vaporizing a gettering agent into the atmosphere of an evacuated retort.

Figure 1:
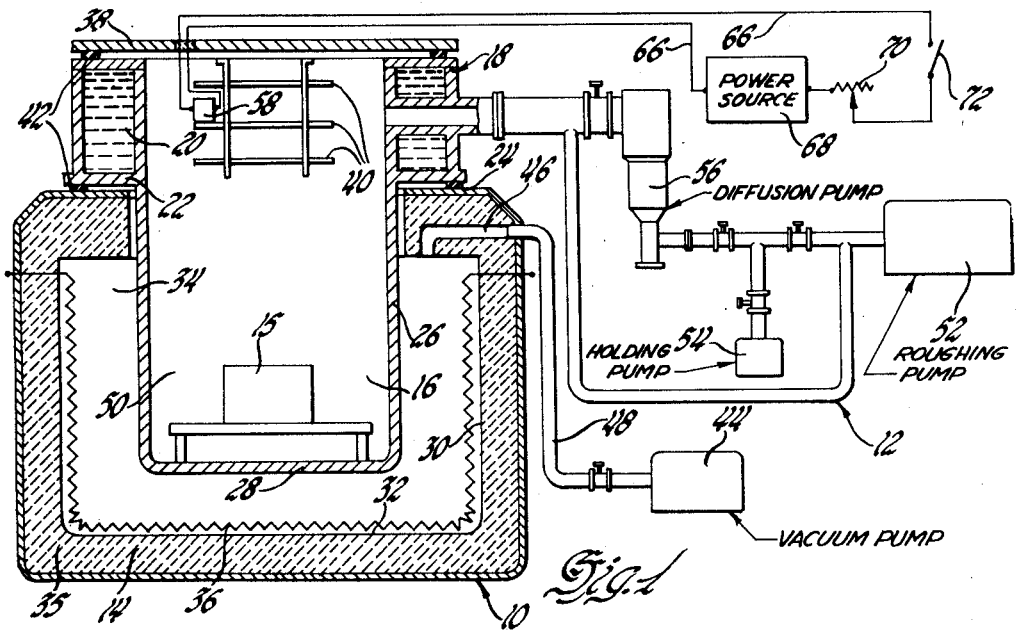
Figure 1 is a schematic view in partial setcion of a furnace having a vacuum retort therein.

Referring more particularly to the drawings, Figure 1 schematically shows a vacuum furnace 10 such as contemplated for use with the present invention and a vacuum pumping apparatus 12 for evacuating the furnace. Furnace 10 has a cylindrical cup-shaped outer heating shell 14 in which is disposed a smaller diameter inner cup-shaped retort 16, the upper extremities 18 of which project above the outer cup-shaped heating shell 14. Work 15 which is to be brazed is placed in the retort and suitably supported therein. The upper region 18 of the retort projecting above the outer heating shell 14 has an annular water jacket 20 around its outer circumferential periphery. The lower wall 22 of the water jacket abuts and is suitably circumferentially sealed to the upper edge 24 of the heating shell 14, thereby supporting the retort 16 depending therein. The side walls 26 and the bottom wall 28 of the retort 16 are spaced from the inner circumferential periphery 30 and the inner lower wall 32 of the outer heating shell 14, thereby forming a generally cup-shaped space 34 therebetween. The lower wall 22 of the annular water jacket 20, being sealed to the upper edge 24 of the heating shell 14, serves as an imperforate upper wall for the cup-shaped space 34 between the retort 16 and the heating shell 14.

The outer cup-shaped heating shell 14 has an inner lining 35 of a refractory material with electrical-resistance type heating elements 36 therein which are suitable for heating the shell to a temperature sufficient to induce a heating of the retort 16 to the brazing temperatures required. A cover 38 placed over the upper opening of the retort and suitably sealed thereto forms an imperforate upper wall for the retort. Secured to the lower surface of the retort cover 38 are a series of baffle plates 40 which depend into the interior upper extremities 18 of the retort. The baffle plates 40 additionally inhibit the radiation of heat into the upper extremities of the cup-shaped member or retort, thereby functioning to reduce the operating temperature of the retort in those areas adjacent the vacuum seals 42. The vacuum seals 42 employed are placed adjacent the water-cooling jacket 20 in order to additionally reduce the operational temperature thereof and increase their useful life.

The space 34 defined by the walls of the heating shell 14, the retort 16 and the water jacket 20 is connected to a mechanical vacuum pump 44 by means of a passage 46 in the wall of the heating shell and the vacuum line 48 secured thereto. The interior 50 of the retort 16 is evacuated to a substantial degree by means of a high-capacity, mechanical roughing pump 52. After substantial evacuation has been effected, a lower capacity holding pump 54 and a diffusion pump 56 are used to complete the evacuation to the degree desired. The major evacuation is accomplished by means of the high-capacity, mechanical roughing pump 52, while final evacuation to the pressure desired is completed by means of the mechanical holding pump 54 and the diffusion pump 56.

The specific means by which the gettering agent is vaporized into the system is not particularly critical, but it must be controllable. Hence, any means of controlled vaporization can be employed. Exemplary of such controllable means are the devices shown in Figures 2, 3, 4 and 5. The method of the present invention comprehends a controlled vaporization of the gettering agent into the remaining atmosphere of the evacuated retort. Since the action of the gettering agent is most effective immediately below the brazing temperature, the premature vaporization thereof must be inhibited. It is therefore desirable to place the gettering agent in a relatively cool portion of the retort 14, such as the upper extremities 18 thereof, where the temperature is insufficient to cause vaporization of the gettering agent. A separate heating means must then be employed to vaporize the gettering agent when desired. Location of the gettering agent and its heating means in the upper part 18 of the retort 14 is advantageous, since this portion is relatively cool due to the encircling water jacket 20 and the baffle plates 40 depending from the retort cover 38. A cup or receptacle 58 containing the gettering agent 59, such as that shown in Figure 2, is placed on one of the baffle plates 40 of the retort cover 38. The cup-like device 58 is composed of a refractory material 60, such as ceramic or the like, having electrical resistance coils 62 embedded in the walls thereof for heating the cup to a high temperature. The ends 64 of the resistance coils 62 in the walls of the cup 58 have electrical leads 66 attached thereto which extend therefrom through the retort cover 38 to a power source 68. A variable resistance 70 and a switch 72 are interposed in the electrical circuit formed so that the passing of current through the resistance coils 62 in the cup can be accurately controlled.

Figure 3:
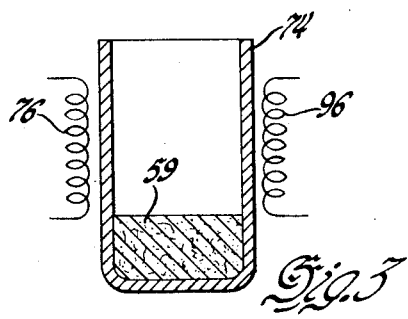
Figure 3 is a schematic sectional view of a modification of the device shown in Figure 2.

Figures 3, 4 and 5 show further examples of devices which can be employed to vaporize the gettering agents. A metallic cup 74 containing the gettering agent 59 can be heated suitably by induction means 76 as shown in Figure 3. In addition to resistance and induction heating, the gettering agent 59 can also be vaporized into active participation in the brazing process within the retort by means of arc-type heating as shown in Figure 4. For arc heating the gettering agent 59 is placed in a metal cup 78 and the cup connected to a suitable source of power 80. An electrode 82 of carbon or the like being placed in the cup 78 and connected to the power supply 80 will heat the contents 59 of the cup and vaporize same by arcing therewith. A similar result can be effectively obtained through the employment of an electrical-resistance wire 84 composed of the metallic gettering agent as shown in Figure 5. The ends 86 of the resistance wire are suitably connected to a source of power 88 so that current can be passed through the wire. Upon the passage of current through the wire, it rapidly increases in temperature due to the electrical resistance therein and vaporizes after a short period of current flow.

The following description of an embodiment of the method of this invention will serve to illustrate the operation of the apparatus. During the vacuum-brazing operation the work to be brazed is assembled in a conventional manner and placed in the retort 16. A gettering agent is placed in the heating cup 58 which is on one of the baffle plates 40 of the retort cover 38. The cover is then placed over the upper opening of the retort and suitably sealed thereto with the baffle plates depending into the interior of the retort.

The retort is thereafter evacuated simultaneously with the evacuation of the intermediary space 34 between the retort 16 and the outer heating shell 14. The evacuation of the intermediary space is not always essential to the process and merely serves to inhibit the collapsing of the walls of the retort when it is under the high-vacuum conditions existing during the brazing operation. In this manner, thinner walls can be used for the retort and thus obtain a faster and more efficient conduction of heat therein. Should the retort have thicker or stronger walls, the evacuation of the intermediary space would be unnecessary. A high-capacity mechanical vacuum pump 44 can be employed to evacuate the intermediary space 34. A similar pump 52 can be used to substantially evacuate the retort. When the pressure within the retort has been reduced to approximately 50 microns of mercury, for example, it can be disconnected and replaced with an oil diffusion vacuum pump 56 working in conjunction with a low-capacity mechanical vacuum pump 54 to further reduce and maintain the pressure within the desired brazing limits of one to fifty microns of mercury.

After the retort has been substantially evacuated, current is passed through the electrical-resistance heaters 36 in the outer shell in order to heat the retort to a sufficient brazing temperature. When the retort has attained a temperature immediately below the brazing temperature, the gettering agent 59 is volatilized and thereby introduced into the interior 50 of the retort. This is accomplished simply by closing the switch 72 on the electrical circuit connected to the cup 58 containing the gettering agent. The heating of the cup vaporizes the gettering agent in the cup and accurately dispenses the same into the interior of the retort.

The gettering agent is volatilized at a temperature immediately below the brazing temperature in order to be most effective. If volatilized at a retort temperature far below the brazing temperature, the gettering agent will merely combine with atmospheric oxygen and most of the surface oxides which would have been later removed by the vacuum alone at the increased temperature, leaving the resistant oxides virtually unaffected.

Thus, in vaporizing the gettering agent at a temperature "immediately below" the brazing temperature, we refer to vaporization at a temperature which is sufficiently close to the brazing temperature that a substantial amount of getting agent still remains in the atmosphere of the retort when the brazing temperature has been attained and thereby removes the last traces of free oxygen in the system as well as the remaining surface oxides on the metal which is to be joined. The preferred temperature is a variable dependent upon the nature of the materials, the complexity and surface area of the parts and the rate at which the furnace is heated. Gettering agent vaporizations at approximately 50 to 150° F. below the brazing temperature have proved to be effective.

In some instances, however, it may be advantageous to supply the gettering agent to the system at both times to improve wetting and bonding characteristics. The plurality of gettering agent vaporizations or additions in the retort during the temperature rise of the furnace is particularly advantageous for maintaining a clean surface on the metal to be brazed. The first addition of gettering agent, when employing a plurality of additions, should take place at about the temperature at which extreme corrosion of the metal to be brazed begins to occur. Thus, for nickel base alloys, the first addition should be generally during the temperature range of about 1100 to 1300° F. The final addition should occur at a temperature immediately below the melting point of the brazing material as described above.

Alkali and alkaline earth metals are substances comprehended by this invention to be employed as gettering agents. Thus, lithium, sodium, potassium, rubidium and cerium can be used. In addition, the present invention can also be practiced employing calcium, strontium, or barium as the gettering agents. These metals have a particularly strong affinity for oxygen and can remove the same both from the atmosphere within the furnace as well as from the surface of the metal to be brazed. In particular, lithium, sodium, calcium, and barium have provided highly satisfactory results.

The present invention can be advantageously employed to join alloys, such as those having an aluminum, titanium or zirconium content above 1½%. Although some of these alloys can be brazed satisfactorily in a vacuum, the gettering action of the present invention produces a stronger bonding and permits much higher pressures to be employed. Examples of such alloys are the following:

| | |
|---|---|
| Chromium | 14–17%. |
| Iron | 9–11%. |
| Molybdenum | 4–7%. |
| Carbon | .16% maximum. |
| Aluminum | 1.75–2.25%. |
| Titanium | 2.25–2.75%. |
| Manganese | 1% maximum. |
| Cobalt | 2.5% maximum. |
| Balance nickel. | |

| | Percent |
|---|---|
| Carbon | .04 |
| Chromium | 15 |
| Columbium | 1.0 |
| Titanium | 2.4 |
| Aluminum | .6 |
| Iron | 7 |
| Balance nickel. | |

These typical alloys contain oxides on their surfaces which are not readily vaporized. Extremely low pressures in the order of one micron of mercury must be employed to volatilize them. Thus, pressures in the range of one micron of mercury, at the brazing temperatures employed, are required for the production of satisfactory joints by conventional vacuum-brazing methods. Through the use of a gettering agent, the pressures employed can be substantially increased to a point that effective brazing can be attained employing pressures as high as approximately 50 microns of mercury.

The former of the above-described nickel-base alloys can be brazed to form a strong joint employing lithium as a gettering agent at a temperature of 1900° F. The parts made from this alloy are assembled as conventionally practiced in the art of brazing. Particularly successful results are obtained by applying the brazing material as a powder which is suspended in a quick-drying organic resin. This suspension is applied to the joint, allowed to dry, and the assembly then placed in the retort. Satisfactory brazing of this alloy is accomplished by means of the brazing material designated as AMS-4777, the composition of which is as follows:

| | |
|---|---|
| Carbon | .5% maximum. |
| Silicon | 3–5%. |
| Chromium | 6–8%. |
| Nickel and cobalt | 78–86%. |
| Cobalt (if determined) | 1% maximum. |
| Iron | 2–4%. |
| Boron | 2.5–3.5%. |

Metallic lithium is placed in a ceramic resistance-heated cup, such as shown in Figure 2, and the cup placed on a baffle of the retort cover. With the cover placed over the retort and sealed, the retort is evacuated to and maintained at a pressure of approximately 35 microns of mercury and then heated to the brazing temperature. During the temperature rise to approximately 1900° F. a portion of the lithium is vaporized at about 1100° F. to aid in cleaning the metal surfaces. Immediately below the brazing temperature, at approximately 1800° F., additional lithium is vaporized to remove the final traces of oxygen in the atmosphere within the retort and to further cleanse the surface of the metal to permit adequate brazing to occur.

Oxides on the surface of some alloys cannot be completely removed by vacuum conditions alone within the limits of the commercial vacuum-brazing apparatus. Thus, heretofore these substances could not be brazed satisfactorily under conventional vacuum conditions. The method of the present invention is then particularly applicable to brazing of these type metals. A typical example of an alloy which cannot be satisfactorily brazed merely under commercial vacuum conditions without the aid of a gettering agent is the following, hereinafter referred to as alloy A-286:

| | Percent |
|---|---|
| Carbon | .08 |
| Chromium | 14.75 |
| Nickel | 25 |
| Molybdenum | 1.25 |
| Sodium | 2.5 |
| Titanium | 1.9 |
| Aluminum | .20 |

Balance iron.

Alloy A-286 is brazed in a manner similar to that described above. The parts to be brazed are assembled and the brazing material applied as described. A powdered brazing material designated as AMS-4775 is employed to effect the brazing of the alloy A-286. The composition of AMS-4775 is as follows:

| | |
|---|---|
| Carbon | .6-1.3% |
| Silicon | 3-5%. |
| Chromium | 13-20%. |
| Nickel and cobalt | 65-75%. |
| Cobalt (if determined) | 1% maximum. |
| Iron | 3-5%. |
| Boron | 2.75-4.75% |

Lithium metal is placed in the ceramic cup which is positioned on one of the baffles as hereinbefore noted. The work is placed in the retort and the retort is evacuated to a pressure of approximately one micron of mercury. The retort is thereafter heated to the desired brazing temperature. As above, a stronger bond is obtained by employing a plurality of lithium vapor additions to the atmosphere. Lithium vapor is introduced during the temperature rise at 1100° F. and also at approximately 1800° F., which is immediately below the brazing temperature of 1900° F.

The amount of gettering agent which is to be added will vary since it is dependent upon several factors, including the nature of the material, the brazing temperature, the surface area of the parts to be joined, and the size of the retort. In general, however, one ounce of the gettering agent for every four to five cubic feet of retort volume appears to be a satisfactory amount for most brazing operations.

The nature of the brazing material employed is not any more critical in the practice of the method of this invention than in conventional methods. The temperature to which the joint is to be subjected and the nature of the base material often are major factors determining which specific brazing alloy is to be used. In conjunction with the method of the present invention, the use of silver and silver alloys as brazing materials has proved to be particularly advantageous. Alloys of silver containing lithium have substantially lower melting points than those without lithium. For example, in employing lithium as a gettering agent in the subject invention and silver or silver alloys as a brazing material, the injection of lithium into the system permits the lithium to alloy with the silver brazing material, reducing the melting point temperature thereof from approximately 1700° F. to 1425° F. Thus, in such instances, low brazing temperatures can be used, resulting in a considerable reduction in distortion and other metallurgical problems.

Although the present invention has been illustrated in connection with certain specific examples thereof, no limitation is intended thereby except as defined by the appended claims.

We claim:

1. A method of vacuum brazing which comprises assembling parts to be brazed with a suitable brazing material applied at the areas to be joined, placing said assembly in a closed furnace, evacuating said closed furnace, heating said furnace to a temperature suitable for brazing said assembly, vaporizing a gettering agent into the atmosphere of said furnace during the heating thereof at a temperature immediately below the brazing temperature, cooling said furnace, increasing the pressure therein, and subsequently removing said assembly from said furnace.

2. A method of vacuum brazing which comprises assembling parts to be brazed with a suitable brazing material applied at the areas to be joined, placing said assembly in a closed furnace, placing a gettering agent in a portion of said closed furnace which will not attain the vaporization temperature of said gettering agent during the heating of said furnace, evacuating said closed furnace, heating said furnace to a temperature suitable for brazing said assembly, vaporizing said gettering agent into the atmosphere of said furnace during the heating thereof, cooling said furnace, increasing the pressure therein, and subsequently removing said assembly from said furnace.

3. A method of vacuum brazing which comprises assembling parts to be brazed with a suitable brazing material applied at the areas to be joined, placing said assembly in a closed furnace, placing a gettering agent in a portion of said closed furnace which will not attain the vaporization temperature of said gettering agent during the heating of said furnace, evacuating said closed furnace, heating said furnace to a temperature suitable for brazing said assembly, vaporizing a gettering agent into the temperature of said furnace during the heating thereof at a temperature immediately below said brazing temperature, cooling said furnace, increasing the pressure therein, and subsequently removing said assembly from said furnace.

4. A method of vacuum brazing which comprises assembling parts to be brazed with a suitable brazing material applied at the areas to be joined, placing said assembly in a closed retort of an electric furnace, said retort having a water jacket surrounding its upper region, placing a gettering agent in the upper region of said closed retort surrounded by said water jacket, evacuating said closed retort, heating said electric furnace to a temperature suitable for brazing said assembly, vaporizing said gettering agent into the atmosphere of said closed retort during the heating thereof, cooling said furnace, introducing air therein, and removing said assembly from said furnace.

5. A method of vacuum brazing which comprises assembling parts to be brazed with a suitable brazing material applied at the areas to be joined, placing said assembly in a closed retort of an electric furnace, circulating a liquid coolant around an upper region of said retort, placing a gettering agent in an electrically heated ceramic cup, placing said cup in the upper region of said closed retort, evacuating said closed retort to a pressure of approximately 1 to 50 microns of mercury, heating said electric furnace so as to increase the temperature thereof to a suitable brazing temperature, vaporizing said gettering agent during the heating of said furnace at a temperature immediately below said brazing temperature, cooling said retort, increasing the pressure therein, and removing said brazed assembly.

6. A method as claimed in claim 5 wherein the gettering agent is from the class consisting essentially of alkali and alkaline earth metals.

7. The method as claimed in claim 5 wherein the gettering agent employed is from the group consisting essentially of lithium, potassium, calcium and barium.

8. An apparatus for the vacuum brazing of metals comprising a furnace having a closed retort, means for heating said furnace, means for evacuating said closed retort, and means for maintaining a region of said closed retort cooler than the main body of said closed retort, means in said cooler region of said closed retort for vaporizing a gettering agent.

9. An apparatus for the vacuum brazing of metals comprising a furnace having an outer heating shell and an inner closed retort, said retort having a portion thereof projecting without said heating shell, means for cooling said portion of said retort, means in said portion of said retort for vaporizing a gettering agent, means for evacuating said closed retort, and means for heating said furnace.

10. The apparatus as described in claim 9 wherein the means for vaporizing the gettering agent is an electrical resistance heated cup.

11. The apparatus as described in claim 9 wherein the means for vaporizing the gettering agent is an electrical induction heated cup.

12. The apparatus as described in claim 9 wherein the means for vaporizing the gettering agent is electric arc heating.

13. The apparatus as described in claim 9 wherein the means for vaporizing the gettering agent is a resistance wire composed of a gettering agent which is vaporized from heat due to inherent electrical resistance during the passage of current therethrough.

14. An apparatus for vacuum brazing of metals comprising an annular cup-shaped electrically heated outer heating shell, a retort within said outer heating shell having an upper opening therein, a cover for sealing said opening in said retort, baffle plates depending from said cover for said retort, an upper portion of said retort projecting above said heating shell, a water jacket around said upper portion projecting above said outer heating shell, heating means for vaporizing a gettering agent in said upper region of said retort supported by said baffle plates, and means for evacuating said retort.

15. An apparatus for vacuum brazing of metals comprising an annular cup-shaped electrically heated outer heating shell, a retort within said outer heating shell having an upper opening therein, a cover for sealing said opening in said retort, baffle plates depending from said cover for said retort, an upper portion of said retort projecting above said heating shell, a water jacket around said upper portion projecting above said outer heating shell, a ceramic cup for vaporizing a gettering agent in said upper region of said retort supported by said baffle plates, said ceramic cup having walls in which electrical resistance coils are disposed for heating said cup, electrical leads extending from said resistance coils in said ceramic cup through said cover to a source of electrical power, and means for evacuating said retort.

16. An apparatus for vacuum brazing of metals comprising an annular cup-shaped electrically heated outer heating shell, a retort within said outer heating shell having an upper opening therein, a cover for sealing said opening in said retort, baffle plates depending from said cover for said retort, an upper portion of said retort projecting above said heating shell, a water jacket around said upper portion projecting above said outer heating shell, a barium containing electrical resistance wire in an upper region of said retort supported by said baffle plates, said resistance wire having ends thereon attached to electrical leads which extend through said cover to a source of electrical power, said source having sufficient power to cause vaporization of said resistance wire when current from said source is passed therethrough, and means for evacuating said retort.

References Cited in the file of this patent

UNITED STATES PATENTS

| | | |
|---|---|---|
| 1,211,635 | Smith | Jan. 9, 1917 |
| 1,893,380 | Uschman et al. | Jan. 3, 1933 |
| 2,279,854 | Whitney | Apr. 14, 1942 |
| 2,747,066 | Brace | May 22, 1956 |